UNITED STATES PATENT OFFICE.

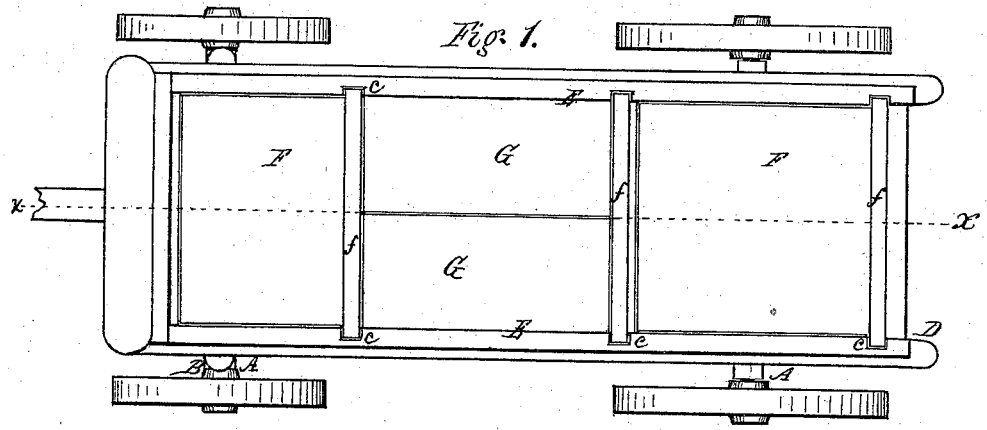
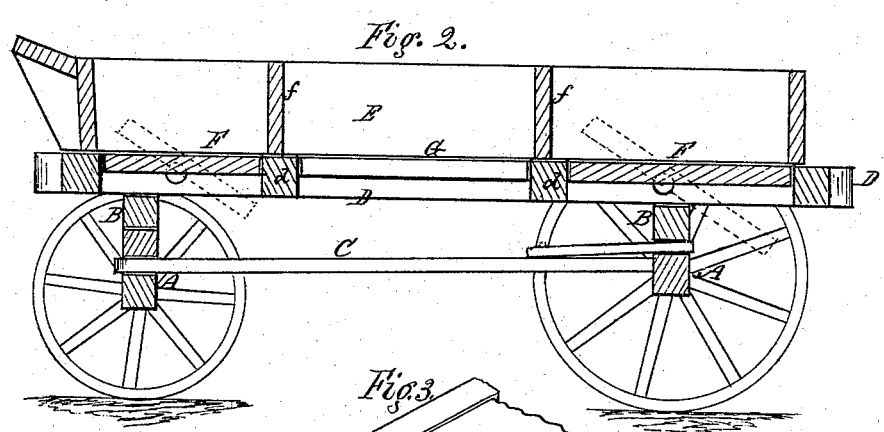
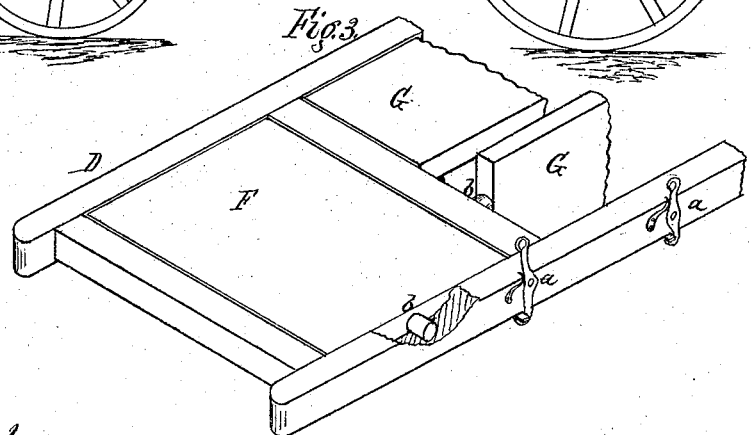

WILLIAM BUCK, OF PETERBOROUGH, CANADA.

IMPROVEMENT IN DUMPING-WAGONS.

Specification forming part of Letters Patent No. 133,300, dated November 26, 1872.

*To all whom it may concern:*

Be it known that I, WM. BUCK, of Peterborough, in the county of Peterborough and Province of Ontario, Canada, have invented a certain Improvement in Dumping-Boxes for Wagons, of which the following is a specification:

My improvement belongs to that class where the cart is formed in separate sections or boxes which may be dumped in succession. The invention consists in the construction of the body of the cart in two parts, one of which constitutes the frame, which has the dumping-sections plane or level with its upper surface, while the other is an open box partitioned into compartments, and setting on the frame to hold the load.

In the drawing, Figure 1 is a plan; Fig. 2, a section in line $xx$; Fig. 3, a perspective view of a portion of the frame or lower part of the wagon.

A A represent the axles, B B the bolsters, and C the reach, which are similar to those of other wagons. D is the frame forming the bottom of the wagon-body, and E is the open box, which said parts form the subject of my invention. The frame and the box are made separate from each other, and are placed one on top the other, resting on the bolsters and held by stakes at the corners. In the frame are located the four dumping sections or platforms, F F and G G, the first-named two being located in the ends and the other two in the middle. These sections lie flat and level with the top of the frame, so as to form a smooth floor, and are mounted upon journals $b\ b$, resting in the frame, and so balanced that the preponderance of weight of the load will be a little one side the axis, to make the sections self-dumping when released. The two end sections turn backward to dump their load, while the two middle sections turn sidewise each side of the reach, but close together closely when shut. The sections are retained in place, when loaded, by spring-catches of any desired kind, as shown at $a\ a$, Fig. 3. These catches may be opened by hand outside the cart to dump the load, or they may be operated by cords or chains which connect with levers near the driver's seat. When the sections close they are self-acting. Buttons, bolts, pins, or other devices might be used for the purpose. The box E is made open on top and bottom, so that when the load is thrown in it rests upon the sections F F and G G. Removable partitions $f\ f$ are used, which slide into grooves $c\ c$, and strike onto cross-pieces $d\ d$ of the frame which separate the sections. In this manner the various compartments are formed which correspond with the sections. The middle compartment, however, covers both hinged sections.

The advantages of this construction are as follows: A smooth bottom is obtained, which may be used for dumping the separate loads, as described above, or for discharging the whole load in one body, in which case the partitions $f\ f$ are removed; or the load may be shoveled out in the ordinary manner, as the shovel moves as freely over the plane surface as it does over that of an ordinary wagon. This cannot be the case where tilting-boxes are employed. Another advantage is, the open box E may be removed, and the frame D, with its smooth floor, may be used for transporting those articles which cannot be placed in a box, which cannot be done in any other dumping-wagon with which I am acquainted. It also enables any other body, rack, or other device to be placed on the axles. Another advantage lies in the peculiar method of tilting the sections, the end ones opening backward and the middle ones sidewise, by which means the ordinary reach may be employed. By this means, also, I can get a greater number of the sections, which is an advantage.

This wagon is of use for many purposes, such as grading roads, drawing dirt, manure, coal, &c., since it enables the operator not only to unload the contents quickly, but to deposit it in detail at any point desired, or to carry different material and deposit them separately from the same wagon.

What I claim, and desire to secure by Letters Patent, is—

The frame D, forming the bottom of the wagon-body, provided with the turning sections or platforms F F G G, located on a level with its top, when combined with the removable open box E, in the manner and for the purpose specified.

In witness whereof I have hereunto signed my name in the presence of two subscribing witnesses.

WILLIAM BUCK.

Witnesses:
 R. F. OSGOOD,
 FRED. A. HATCH.